(12) United States Patent
Crickmore et al.

(10) Patent No.: US 10,578,472 B2
(45) Date of Patent: Mar. 3, 2020

(54) FLUID INFLOW

(71) Applicant: OPTASENSE HOLDINGS LIMITED, Farnborough, Hampshire (GB)

(72) Inventors: Roger Crickmore, Farnborough (GB); Andrew Ridge, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 617 days.

(21) Appl. No.: 15/307,571

(22) PCT Filed: May 8, 2015

(86) PCT No.: PCT/GB2015/051359
§ 371 (c)(1),
(2) Date: Oct. 28, 2016

(87) PCT Pub. No.: WO2015/170115
PCT Pub. Date: Nov. 12, 2015

(65) Prior Publication Data
US 2017/0052050 A1    Feb. 23, 2017

(30) Foreign Application Priority Data

May 8, 2014    (GB) .................................. 1408131.9

(51) Int. Cl.
*G01F 1/696*    (2006.01)
*E21B 47/06*    (2012.01)
(Continued)

(52) U.S. Cl.
CPC ............ *G01F 1/696* (2013.01); *E21B 47/065* (2013.01); *E21B 47/102* (2013.01);
(Continued)

(58) Field of Classification Search
CPC . G01F 1/96; G01F 1/661; G01F 1/704; G01F 1/696; E21B 47/065; E21B 47/102; E21B 47/123
(Continued)

(56) References Cited

U.S. PATENT DOCUMENTS 6,618,677 B1    9/2003    Brown
8,942,703 B2    1/2015    Jo et al.
(Continued)

FOREIGN PATENT DOCUMENTS

CN    102364046    2/2012
CN    202381084    8/2012
(Continued)

OTHER PUBLICATIONS

Wang, Modeling Flow Profile Using DTS System (Year: 2008).*
(Continued)

*Primary Examiner* — Michael P Nghiem
*Assistant Examiner* — Dacthang P Ngo
(74) *Attorney, Agent, or Firm* — McDonnell Boehnen Hulbert & Berghoff LLP

(57) ABSTRACT

Methods and apparatus for obtaining an indication of fluid inflow in a section of a gas well having multiple perforations through which fluids comprising gas and/or liquid enter the well are described. In an example, the temperature within the section of the gas well is monitored at a plurality of locations. The locations comprising (a) a first set of locations, at or near a perforation; and (b) a second set of locations at which the temperature is substantially independent of the effects of the inflow of gas at a perforation. An indication of temperature excursions at the locations is obtained and used to obtaining an indication of the inflow of fluids to the well by relating the indications of temperature excursions from the second set of locations to liquid inflow and relating the indications of temperature excursions from the first set of locations to liquid and gas inflow.

21 Claims, 6 Drawing Sheets

(51) Int. Cl.
*E21B 47/10* (2012.01)
*E21B 47/12* (2012.01)
*G01F 1/66* (2006.01)
*G01F 1/704* (2006.01)

(52) U.S. Cl.
CPC ............ *E21B 47/123* (2013.01); *G01F 1/661* (2013.01); *G01F 1/704* (2013.01)

(58) Field of Classification Search
USPC .......................................................... 702/6
See application file for complete search history.

(56) References Cited

U.S. PATENT DOCUMENTS

| | | |
|---|---|---|
| 9,215,718 B2 | 12/2015 | Jo et al. |
| 2011/0284217 A1 | 11/2011 | Brown |
| 2014/0172302 A1* | 6/2014 | Kalia ............... E21B 47/10 702/6 |

FOREIGN PATENT DOCUMENTS

| | | |
|---|---|---|
| CN | 202451145 | 9/2012 |
| WO | 2004/076815 | 9/2004 |
| WO | 2012/137021 | 10/2012 |
| WO | 2013/045941 | 4/2013 |

OTHER PUBLICATIONS

Ouyang, Flow Profiling via DTS System—Expectation and Reality (Year: 2004).*
Holley, Interpreting Uncemented Multistage Hydraulic Fracturing Completion Effectiveness Using Fiber Optic DTS Injection data (Year: 2012).*
Well Performance Diagnosis With Temperature Profile Measurements (Year: 2011).*
Ouyang L-B et al., "Flow profiling by distributed temperature sensor (DTS) system—expectation and reality", SPE Production & Operations: An Official Publication of the Society of Petroleum Engineers, vol. 21, No. 2, May 1, 2006, pp. 269-281.

* cited by examiner

FLUID INFLOW

FIELD OF THE INVENTION

This invention relates to fluid inflow, in particular but not exclusively to fluid inflow in a well bore of a hydrocarbon well such as a gas well.

BACKGROUND OF THE INVENTION

In hydrocarbon production, there is often a desire to accurately track fluids within a well. This is useful for the efficient running of a well, for example to determine how various portions of the well are contributing to the overall production. In addition, it may be that different entities own different reservoirs which are accessed by a common well bore. Understanding fluid flow in the well allows the earnings of particular owners to be determined according to the volume of hydrocarbon produced from that reservoir.

As will be familiar to the skilled person, the desired hydrocarbon (oil, gas, etc), is not the only fluid in a well. Other fluids, such as water, will also be found. Indeed, water control is often a key concern for well operators. The water must be separated out from the desired hydrocarbon, before usually being chemically treated and returned to the ground, all of which adds to operational costs. Where the water volume exceeds a certain level, a well may become economically unviable. In certain gas wells, water may also inhibit or stop flow where the gas pressure is too low to push the water out.

Access from a wellbore to a hydrocarbon reservoir can be via one or more perforations in the wall of a wellbore casing. Where the volume of water inflow from a particular perforation is significant (or significant in comparison to the amount of hydrocarbon), the perforation may be deemed to have become 'watered out', and blocking off the perforation may increase the well profitability. However, it is often difficult to determine which perforations are contributing excessively to the water content in a well.

Known production logging tools to monitor flow within a well include flow meters such as turbine meters, or 'spinners', which are placed inside a functioning well to measure the velocity of fluid flow based on the speed of rotation of a spinner. Unfortunately, the relationship between the spinner's speed of rotation and the actual fluid flow are complex due to friction and fluid viscosity and at lower flow velocities a spinner may not function at all. Also, such spinners interfere with flow and often provide confusingly different measurements when being inserted and withdrawn. Further, it is not easy to distinguish between fluids using spinners.

There are other flow meters, such as gas orifice meters, ultrasonic flow meters, Coriolis meters, etc. which have associated advantages and drawbacks. However, all such meters are subject to damage from their hostile operating environment, require careful calibration and impede flow.

In addition, multiphase meters, which are capable of distinguishing between liquids and gases (which could be gas, oil and/or water) are also known. Again, such meters are subject to harsh environments and may not be able to isolate the contributions from individual perforations.

All such methods require well intervention, with associated safety concerns, and well down-time, and are only capable of providing a 'snapshot' in time. Using optical fibres to estimate the temperature of a well and imply flow rates therein is also known, for example from U.S. Pat. No. 6,618,677. However, the method described therein relies on a complex model and requires a well 'shut in' before the method may be employed.

SUMMARY OF THE INVENTION

According to a first aspect of the invention, there is provided a method of obtaining an indication of fluid inflow in a section of a gas well having multiple perforations through which fluids comprising gas and/or liquid enter the well, comprising the steps of:

(i) monitoring the temperature at a plurality of locations within the section of the gas well, the locations comprising (a) a first set of locations, at or near a perforation; and (b) a second set of locations at which the temperature is substantially independent of temperature effects of the inflow of gas at a perforation;

(ii) determining an indication of temperature excursions at the locations;

(iii) obtaining an indication of the inflow of fluids to the well by relating the indications of temperature excursions from the second set of locations to liquid inflow and relating the indications of temperature excursions from the first set of locations to liquid and gas inflow.

As will be described in greater detail below, by monitoring the temperature at a perforation, the effect of gas inflow at the perforation on temperature through the Joule Thompson cooling effect and the liquid (typically largely water) in the gas well can be obtained. By monitoring the temperature away from the perforations (for example at points between the perforations referred to herein as nulls), the temperature changes due to liquid flow can be considered, to a good approximation, independently from that of gas inflow. This allows an estimate of both liquid and gas inflow to made, which in turn can assist in well management. The method may also be applied over the whole gas well.

In some embodiments therefore, the method comprises determining an indication of inflow of water and/or gas from at least one perforation. This may allow a well operator to consider the implications of closing or sealing a particular perforation, and/or to attribute earnings amongst parties having an interest in the well.

The step of monitoring the temperature may comprise monitoring temperature changes without monitoring the actual temperature. In some embodiments, the temperature excursions are monitored over a period of time, and the step of determining an indication of temperature excursions comprises summing temperature fluctuations, averaging temperature fluctuations, and/or integrating signal energy arising from temperature fluctuations detected over the period. One such method comprises summing the 'energy' in the signals. As the skilled person is aware, at any given depth, the well will have a background, or equilibrium, temperature which is dictated by the geothermal energy of the ground in which a well is formed. Typically, wells are hotter at the bottom than the top and fluid or gas entering and/or moving through well results in temperature displacements from this equilibrium temperature. The energy causing these fluctuations is indicative of the fluid flows.

If at least one of the second set of locations is above all well perforations, an estimate of the temperature excursion due to the total volume of water produced by the well in a time period can be determined. Further, it may be advantageous to obtain a measurement of the total volume of gas produced by the well section. Such measurements may be advantageous in scaling results to further estimate the volume of fluid/gas inflow at each perforation by reference to the total volumes of fluid/gas.

In some examples, the first set of locations comprises locations at each perforation of the well section, and/or the second set of locations lie to each side of a location from the first set. This allows the contribution from each perforation to be considered, which may be of interest in well management.

In some examples, the method may comprise determining a well section in which to apply the method. In such examples, the section may be determined such that the speed with which fluid rises through the well is substantially constant. This simplifies the processing required. However, in other examples, a local velocity of the fluid could be determined (for example by considering the speed with which temperature features associated with a particular phenomena such as a 'slug', as described in greater detail herein after move up the well), and this could be incorporated into the model on the basis that slower moving liquid has a greater length of time to transfer energy, which may allow readings from two well sections to be compared.

Alternatively or additionally, the well section may be selected so as to be free of standing liquid. It will be appreciated that standing water may be seen at the base of a well. However as the method relies, at least in part, on fluids moving in the well, any such section is preferably avoided in carrying out the method.

Advantageously, the step of temperature monitoring is carried out by monitoring backscatter in a Distributed Acoustic Sensing (DAS) fibre (i.e. may be carried out by monitoring backscatter in an optical fibre suitable for use with Distributed Acoustic Sensing (DAS) sensing techniques). Such a system is capable of monitoring relatively small and/or rapid changes in temperature.

A method according to any preceding claim in which the absolute temperature is measured at at least one location. Knowing the actual temperature at at least one location may assist in determining the fluid flows in a well.

According to a second aspect of the invention, there is provided apparatus for obtaining an indication of fluid inflow in a section of a gas well having multiple perforations through which fluids comprising gas and/or liquid enter the well, comprising:
- an optical fibre, arranged along the length of the well section;
- an interrogator unit arranged to interrogate the fibre with optical radiation and to detect any radiation backscattered within the optical fibre;
- processing circuitry arranged to process the detected signals to determine an indication of temperature excursions at (i) a first set of locations, which are at or near a perforation and (ii) a second set of locations at which the temperature is substantially independent of the effects of the inflow of gas at a perforation;
- wherein the processing circuitry is further arranged to determine an indication of the inflow of fluids to the well by relating the indications of temperature excursions from the second set of locations to liquid inflow and relating the indications of temperature excursions from the first set of locations to liquid and gas inflow.

According to another aspect of the invention, there is provided processing apparatus configured to carry out the method of the first aspect of the invention and/or to act as the processing circuitry of the second aspect of the invention.

DESCRIPTION OF THE DRAWINGS

Embodiments of the invention are now described by way of example only with reference to the accompanying figures, in which.

DESCRIPTION OF THE INVENTION

Figure 1:
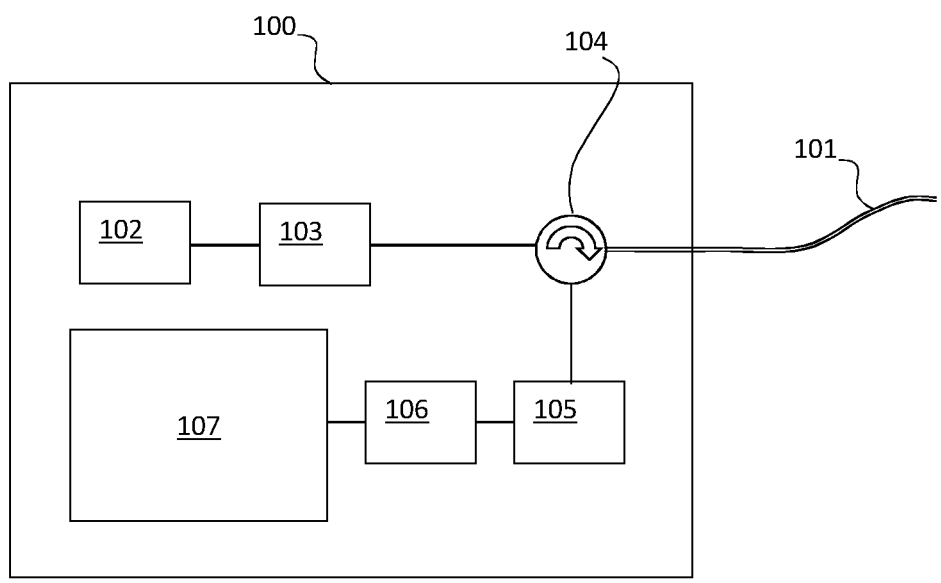
FIG. 1 shows a distributed fibre optic sensing apparatus.

FIG. 1 shows a schematic representation of a distributed fibre optic sensing arrangement. A length of sensing fibre 101 is removably connected at one end to an interrogator unit 100. The sensing fibre 101 is coupled to an output/input of the interrogator unit 100 using conventional fibre optic coupling means. The interrogator unit 100 is arranged to launch pulses of coherent optical radiation into the sensing fibre 101 and to detect any radiation from said pulses which is backscattered within the optical fibre 101. For a Rayleigh scattering based fibre optic distributed sensing apparatus, the interrogator unit 100 will detect radiation which has been Rayleigh backscattered from within the fibre 101. To generate the optical pulses, the interrogator unit 100 comprises at least one laser 102. The output of the laser 102 is received by an optical modulator 103 which generates the pulse configuration as will be described later. The pulses output from the optical modulator 103 are then transmitted into the sensing fibre 101, for instance via a circulator 104. An alternative to using an optical modulator would be to drive the laser in such a way that it produces a pulsed output.

Note that as used herein the term "optical" is not restricted to the visible spectrum and optical radiation includes infrared radiation, ultraviolet radiation and other regions of the electromagnetic spectrum.

A proportion of the light in the fibre 101 is backscattered from scattering sites within the fibre 101. In a simple model, the number of scattering sites can be thought to determine the amount of scattering that could occur and the distribution of such scattering sites determines the interference. A stimulus may result in a change of optical path length within the relevant section of fibre (which could be a physical change in length and/or a change in the effective refractive index in part of the fibre). In this simple model, this can be thought of as changing the separation of the scattering sites but without any significant effect on the number. The result is a change in interference characteristics. In effect, the stimulus leading to optical path length changes in the relevant section of fibre can be seen as varying the bias point of a virtual interferometer defined by the various scattering sites within that section of fibre 101.

Any optical radiation which is backscattered from the optical pulses propagating within the sensing fibre 101 is directed to at least one photodetector 105, again for instance via the circulator 104. The detector output is sampled by an analogue to digital converter (ADC) 106 and the samples from the ADC 106 are passed to processing circuitry 107 for processing. The processing circuitry 107 processes the detector samples to determine an output value for each of a plurality of analysis bins, each analysis bin or channel corresponding to a different (albeit possibly overlapping) longitudinal sensing portion of interest of optical fibre 101. It will be noted that the interrogator unit 100 may comprise various other components such as amplifiers, attenuators, additional filters, noise compensators, etc. but such components have been omitted in FIG. 1 for clarity in explaining the general function of the interrogator unit 100.

Figure 2:
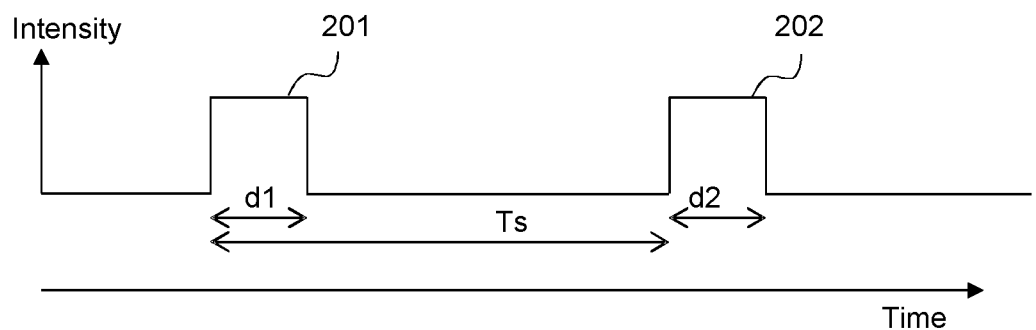
FIG. 2 shows pulses which may be used in distributed fibre optic sensing.

In embodiments of the present invention, the laser 102 and modulator 103 are configured to produce at least one series of pulse pairs at a particular launch rate as now discussed in relation to FIG. 2. However, other pulse configurations are possible.

FIG. 2 shows a first pulse 201 at a first frequency F1 and having a duration d1 followed a short time later by a second pulse 202 having a second frequency F2 and having a second duration d2. The frequencies of the two pulses F1, F2 may be the same, or may differ. In some examples, the durations (and hence the spatial widths) of the two pulses d1, d2 are equal to one another although this need not be the case. The two pulses 201, 202 have a separation in time equal to Ts (as shown Ts represents the time separation between the leading edges of the pulses).

When a pulse pair propagates within the optical fibre 101, some light will be scattered from each of the pulses 201, 202 from the intrinsic scattering sites within the optical fibre 101. At least some of this backscattered light will be guided back to the beginning of the optical fibre 101 where it can be detected. The backscatter signal received at the detector 105 at any instant is an interference signal resulting from the combination of the scattered light.

The distributed fibre optic sensor of FIG. 1 relies on the fact that any disturbance to the optical fibre e.g. strain, or thermal expansion or changes in refractive index due to temperature changes in the optical fibre 101 will cause an optical path length change which can therefore phase modulate the interference signal generated. Detecting a phase change in the interference signal from a particular section of fibre 101 can thus be used as an indication of an optical path length change upon the optical fibre 101 and hence as an indication of conditions (temperature, strain, acoustic etc) at that section of fibre 101. Such phase based sensors have the advantage of providing a linear and quantitative response to an incident stimulus. In principle, a series of single pulses could be used but in that case there would not be a quantitative relation between the output signal and the stimulus.

In this example, the interrogator unit 100 is operated substantially as is described in greater detail in our previously filed applications WO2012/134022 and WO2012/134021, which are incorporated herein by reference to the full extent allowable. In one example, channels are defined by a certain sampling time after launch of a pulse pair, and the successive detector outputs provide a phase modulated carrier signal at a frequency defined by the frequency difference between the pulses of a pulse pair (and therefore comprising an interference signal between light backscattered from both pulses of a pair), which may be obtained, for example, by using the modulator 103 to modulate the frequency between launching the pulses within a pulse pair.

As also described in our previously filed applications WO2012/134022 and WO2012/134021, there may be a relative phase difference between the pulses of a pair, and this relative phase difference may change from one pulse pair to the next. In one arrangement, which offers processing advantages, the carrier frequency is arranged to be one quarter of the launch rate such that a signal at the carrier frequency evolves by 90° in phase between launch of successive pulse pairs. This also allows for efficient use of modulation bandwidth.

Figure 3:
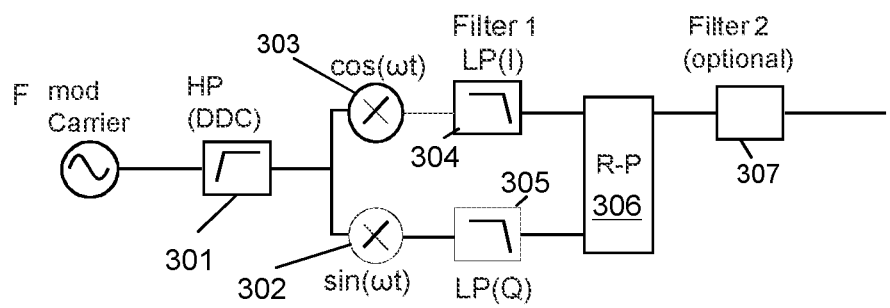
FIG. 3 shows detail of the processing circuitry of the apparatus of FIG. 1.

FIG. 3 illustrates one embodiment of how this modulated carrier signal is processed by processing circuitry 107 to determine the phase of the carrier signal for a single channel.

The samples representing the modulated carrier signal for one channel of the sensor are high pass filtered 301 to remove any components at DC or low frequency. The filtered signal is divided into two processing channels and the signals in each channel are multiplied by either sine 302 or cosine 303 functions at the carrier frequency and then low pass filtered by I and Q component low pass filters 304 and 305 to generate In-phase (I) and quadrature (Q) components as is known in complex demodulation schemes. Where the carrier frequency is ¼ of the ping rate, each sample is multiplied by either 0, +1 or −1. The resultant I and Q signals are then used to calculate the phase value by rectangular to polar (RP) conversion 306.

RP conversion may optionally also generate an amplitude value. The output signal is a phase shift measured in radians over the frequency range from 0 Hz to an upper limit that is determined by I and Q component low pass filters 304 and 305.

In conventional DAS techniques (i.e. those applied to detecting acoustic signals), this phase shift, $\Phi_0$, may be high pass filtered. This is considered advantageous as it eliminates unwanted noise signals that lie in the low frequency region. However, in the current application, it is low frequency temperature changes which are of interest and therefore the phase value may be (optionally) low pass filtered to remove acoustic effects and to that end (in a departure from the teaching of WO2012/134022 and WO2012/134021), the data is passed to a low pass filter 307. In practice, the high frequency signal portion could be retained and processed separately for acoustic sensing, thus providing a combined DAS and temperature (and/or other slow acting changes) sensor. The cut off frequency of the low pass filter 307 is preferably predetermined but it will be appreciated by the skilled person that there is no well defined distinction between acoustic signals and temperature signals. However typically the boundary between them is taken to be somewhere between 0.1 and 1 Hz, although other ranges including for example 1-10 Hz (which could be considered to overlap with the acoustic range) may also be considered. This filtering is further described below. However, as also noted in greater detail below, it may not be required in all examples.

In some embodiments, the threshold of the I and Q component low pass filters 304 and 305 may be selected to isolate, or substantially isolate, the low frequency components of the phase signal, and the subsequent phase value low pass filter 307 may not be required. As the skilled person will appreciate, such filters may be primarily provided to remove the 'double-frequency' components generated in the mixing stage of producing the I and Q components, however they could also be used to remove any component at the carrier frequency which results from any remaining low frequency input signal being multiplied by the sin and cos terms. To that end, the threshold is generally set to be less than the carrier frequency. For example, the low pass filters may be set to have a cut-off at $\frac{1}{13}^{rd}$ of the carrier signal frequency, which will preserve all signals imposing path length changes in the optical fibre at that frequency and below. However, in this example, it is the low frequency signals which are of interest, the low pass filters 304 and 305 could instead have a much lower cut off, of for example 100 Hz or lower. This also assists in improving the stability of the demodulation as now explained.

The stability of the demodulation process depends on sufficient light having been backscattered from the two pulses to generate a carrier with sufficient carrier to noise ratio (CNR). These scattering sites are effectively distributed randomly within the fibre 101. For some sections of the fibre 101, light backscattered will tend to interfere constructively giving a large backscatter level from a pulse while for other sections there will be more destructive interference resulting in a lower backscatter level. If the backscattered light from either of the two pulses falls then the carrier level generated by mixing them together will decrease. A lower carrier level will mean that the I,Q components become noisier and if the noise level becomes too large then phase obtained from them will show a series of $2\pi$ radian jumps thereby corrupting the data. The probability of these $2\pi$ jumps occurring is inversely related to the total noise level on the I and Q components. As this noise is broadband, its level can be reduced by using a lower frequency cut for filters 304 and 305 in FIG. 3. Therefore reducing this bandwidth reduces the chances of generating a $2\pi$ jump in the data and so the stability pf the demodulation process is improved.

The task of isolating the low frequency signal can therefore be carried out by the I and Q component low pass filters 304, 305 or by the phase value low pass filter 307, or be shared between them. However, lowering the cut off threshold of the phase value filter 307 does not improve the stability of the demodulation.

It will also be appreciated that the threshold selected for filtering depends on the signal of interest. Generally, the filter should be designed to retain all of the signal of interest. Considering the example of temperature, therefore, when designing the system, the anticipated temperature variation, and the speed with which the fibre reacts, should be considered, and an upper frequency threshold which preserves the fastest changing value of the anticipated changes.

However, it has been noted that, in some downwell environments (for example, in tight gas wells), temperature signals dominate over acoustic signals. It may therefore be the case that no filtering is required at filter 307 (i.e. the filter 307 may be absent) to isolate the low frequency temperature signal as it may be the dominant signal.

Assuming that the phase change (or the retained low frequency phase change) is largely due to temperature change, the temperature change may be determined from the suitably processed data by multiplying it by a predetermined temperature/phase relationship of the fibre cable. The temperature/phase relationship will depend on the fibre used. In general, the temperature/phase relationship for a bare fibre is well known but this is modified if extra coatings are placed on it or it is included in a cable structure. The temperature/phase relationship for a particular cable could be calculated or experimentally measured. If the primary aim of a particular distributed sensing system based on Rayleigh backscatter in an optical fibre system is to measure temperatures, a fibre with a high change in phase with temperature may be used. This could for example be obtained by using a fibre with a coating of a material (which may be a relatively thick coating to enhance the effect) with a high thermal expansion coefficient.

For a dual pulse system, the conversion of phase to temperature can be done for any amplitude of signal. For single pulse systems this is not possible due to the well-known signal fading issue. However for large slow temperature variations that cause wrapping of the signal, is it possible to estimate the rate of phase and hence temperature change in a single pulse system.

While knowledge of the actual temperature variations may be useful because it enables signals from different locations to be compared which may in turn help develop a better understanding of how various processes cause temperature variations around the sensing fibre 101, in the embodiments described herein below such a measurement is not essential as it is relative temperature changes which are of interest.

Steps may also be taken to compensate for laser phase noise and the like. In particular, laser phase noise is due to a slow drift in the wavelength of the laser generating the interrogating radiation. This can impose a similar phase shift as a slow acting stimulus and may therefore be difficult to distinguish from a temperature change.

In a conventional DAS system to detect acoustic signals, laser phase noise is less of a concern, as it is seen away from the signal band of interest. However, laser phase noise may in some embodiments be a significant component of the phase change signal at low frequencies (say, under 1 Hz). While there is no well-defined distinction between the frequency of acoustic signals and temperature signals, typically the temperature signals will be considered to lie below 1 or 2 Hz, and usually in practical terms will lie between 0.1 and 1 Hz (although, as described herein after, the cut off frequency for determining phase changes due to temperature used herein may be set lower). In some cases temperature variations can only occur over much greater time scales such as hours, days or even longer.

However, phase noise produces a signal that is the same throughout the fibre. Therefore, it may be possible to provide a portion of the fibre which is at least substantially shielded from at least some other slow acting changes (e.g. is in a temperature stable environment, to shield from temperature changes), and to use the backscatter signal from this shielded section of fibre to provide an indication of laser phase noise.

Alternatively or additionally, as laser phase noise is consistent throughout the fibre, laser phase noise may be estimated by calculating the mean signal returned from at least some, and possibly each, portion of the fibre (i.e. each channel). In some examples, the signal from some (preferably most) portions of the fibre could be used to determine the mean, but signals returned from those portions which have high levels of low frequency signal from other sources such as the signal of interest or high levels of noise due to a low carrier signal could be excluded. Although this offers the advantage that no shielded section of fibre is required, it assumes that the low frequency signal of interest in the portions of fibre used to calculate the mean are uncorrelated (as, for example, if the whole fibre was subjected to the same temperature change, this temperature signal would also be consistent across all channels, and difficult to distinguish from noise). However, in the application of temperature sensing in a gas well, such a change would usually be very slow and very low frequency changes can be filtered out with a high pass filter as outlined below.

Once an estimate of laser phase noise has been determined, it could be compensated for in the signals.

In addition, steps may be taken to ensure that 'good quality' data is obtained and utilised in deriving measurement signals. For example, as described in WO2012/137021, a plurality of samples corresponding to each sensing portion of interest may be acquired (these samples may be acquired from overlapping sections of fibre) and designated as separate channels for processing. The channels may be combined according to a quality metric, which may be a measure of the degree of similarity of the processed data from the channels. This allows for samples which have a high noise level, for example due to fading of the carrier signal, to be disregarded, or given a low rating in the final result.

However, the method described in WO2012/137021 utilises a high pass filter, which may also remove thermal information. Therefore, to ensure that this information is returned but that the benefits of the method described in WO2012/137021 are maintained in the context of low frequency phase modulation, the method may be implemented without high pass filtering. Instead of choosing the channels which are most similar, the quality metric may instead be based on a determination of the level of signal at high frequency (with lower levels being favoured), or the ratio between the signal at low frequency (e.g. 2-20 Hz), the signal at high frequency (with higher ratios being favoured), or the maximum differential of the signal with respect to time. These methods are not affected by the level of the DC offset and are based on the fact that most signals due to physical disturbances have a higher level at low frequencies, while the system noise, which depends on the variable carrier level, has a flatter spectrum.

Without additional processing when there is a change in the selection of channels for combination, there is also likely to be a step in the output signal as the new set of channels would generally have a different mean offset to the old set.

Therefore a DC offset may be added to the mean of the selected channels to give the output signal. When the set channels changes, in order to avoid a step change in the output, the difference between the mean of the new set and the old set may be considered and the DC offset may be set to remove any step change. In particular, the mean of several successive samples of channels may be considered and the DC offset change may be smoothed over a number of such sample sets so that there is no step in the data, effectively tapering the data from old to the new set of channels to produce a smoother join.

A quality metric may be determined on a rolling basis or periodically. In any event, the number of samples in the join region should be lower than any block length so as to ensure that the block length is such that multiple changes during the join region can be avoided. This can be controlled either by setting a minimum block length, or setting the number of samples which contribute to a join, or both, and could be predetermined or vary according to the data collected.

As will be appreciated, such a quality metric is used to ensure to ensure that 'good quality' data is emphasised in the processed data. However, in other examples, after 'bad data' has been identified, it could simply be replaced with 'good data' from surrounding channels.

For example, as noted above, demodulation failure may be identified by looking for steps of multiples of $2\pi$ between samples. In practice, this may occur over several samples, such that the full $2\pi$ change may be made over 5, 10 or more samples from different pulse pairs. Therefore, the threshold for detecting a change might be set below $2\pi$, for example 60% of a $2\pi$ change, measured across the difference of, for example, five samples from different pulse pairs, although other thresholds and sample spacing may be appropriate depending on the data set and sample rate.

Samples may be considered from within a time frame of, for example, a second (although other periods may be appropriate for a given sample set). If the characteristic of demodulation failure is detected, this data may simply be replaced one or more neighbouring channels which do not exhibit the characteristic. In one example, if both adjacent channels have not exhibited the characteristic, then the average of these channels may be used. If no adjacent channels are 'good', then data from the closest good channel may used. As mentioned above, it may be desirable to adjust or taper the join between data sets.

Following 'repair' in this way, the data may be downsampled, (for example decimated by 100). Such downsampling may be carried out using one or more of Finite Impulse Response (FIR) filter, through use of a signal processing tool such as the decimation tool in MATLAB or the like. Additional filtering and/or normalisation may be carried out.

Following such decimation, trends in the data will be apparent. It will be noted that this technique relies on the fact that relatively few channels will suffer from demodulation failure, but this is consistent with observed results. It has also been observed that channels suffering from demodulation failure may remain in that state for some time, for example hours.

In some circumstances, such a method will preserve more original data than methods using, for example, weighted averages with reference to a quality metric.

Other methods may be used to assist in identifying data which is likely to suffer from demodulation failure. For example, channels that have a low carrier to noise ratio (CNR), which is typically observed prior to, and after periods of demodulation failure. Therefore, CNR could be used to indicate an anticipated state of demodulation failure and/or data exhibiting low CNR could be replaced as outlined in relation to demodulation failure above.

As use of such a sensing optical fibre 101 is relatively inexpensive, it may be deployed in a wellbore in a permanent fashion as the costs of leaving the fibre 101 in situ are not significant. The fibre 101 is therefore conveniently deployed in a manner which does not interfere with the normal operation of the well. In some embodiments a suitable fibre may be installed during the stage of well construction.

Figure 4:
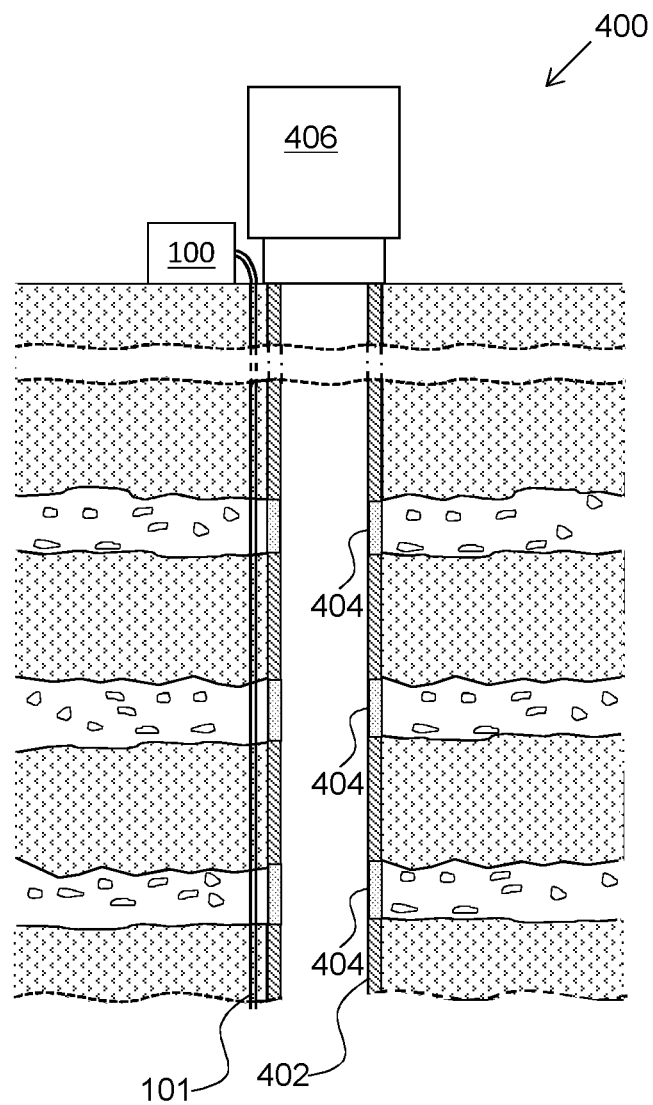
FIG. 4 shows a well incorporating fibre optic sensing apparatus.

FIG. 4 schematically shows a well 400 for accessing underground hydrocarbons, having distributed fibre sensing apparatus associated therewith.

The well 400 comprises a well shaft 402, which has a number of perforations 404. The perforations 404 are in the region of gas reserves, and allow fluids to enter the shaft 402, where they rise, either under their own pressure or raised using pumps and the like, to a well head 406 where the gas is collected and contained.

However, as will be familiar to the skilled person, in practice, a mixture of gas and water will almost always be seen entering the shaft 402 via the perforations 404. When the proportion of water reaches a certain point, the well 400 will become economically unviable. Also, in some instances, a large proportion of water can reduce or even stop the flow of gas from a well. However, if the perforations 404 which are introducing a disproportionate amount of water could be identified and, for example, sealed, this could increase the economic life of the well 400 and the efficiency of extraction. It is also helpful to track how much gas each perforation 404 is contributing to well production.

The well 400 comprises a sensing fibre 101, which is attached to an interrogator unit 100 as described in relation to FIG. 1 above, and, in this example, operated as described in relation to FIGS. 1 to 4.

In use of the well, the fibre 101 is interrogated with radiation to provide temperature sensing as outlined above. This returns a signal which is indicative of a temperature change at a given depth of the shaft 402, and is specifically related to the temperature change in the well 400 at that depth.

As will be familiar to the skilled person, in extraction of a gas reserve, water is usually extracted along with the gas. The water forms what are known as 'slugs' in the well and, as used herein, that term shall be taken to mean a substance which is capable of significant heat transfer within a well bore relative to other substances (e.g. gas) within the well (although note, in this case, 'significant' can mean capable of a temperature change on the order of milliKelvin, which is nevertheless capable of being readily detected by the interrogator unit 100). As water has a higher specific heat capacity and thermal transfer coefficient than gas for a given temperature difference a given volume of water in a well has a greater cooling/heating effect than the same volume of gas. The slugs may be substantially water (although it will be appreciated that the water will likely contain other substances, in particular mud, sand, contaminants, and the like), or may be a portion of gas with a high proportion of water.

The skilled person will also be aware that the expansion of gas as it passes through a perforation 404 and expands into a shaft 402 causes local cooling due to the Joule Thompson effect. Finally, it is also known that there is usually a thermal gradient up a well due to geothermal gradient in the surrounding ground, with the lower sections of the well being generally hotter than the upper sections.

In light of the above, by carefully monitoring for changes in temperature at a perforation, one can detect a slug passing the perforation. Specifically, the slug is likely to heat the area surrounding the perforation, which is otherwise cooled by the expanding gas. However, this need not always be the case: it is possible that the slug may be cooler than the area surrounding a perforation. In any event, as there are different mechanisms affecting the slug temperature and the temperature surrounding the perforation, they are unlikely to be in thermal equilibrium. Further, the amount of cooling by one particular slug will depend on the volume of that slug and its speed (a slower moving slug has more time to affect heat transfer).

Figure 5:
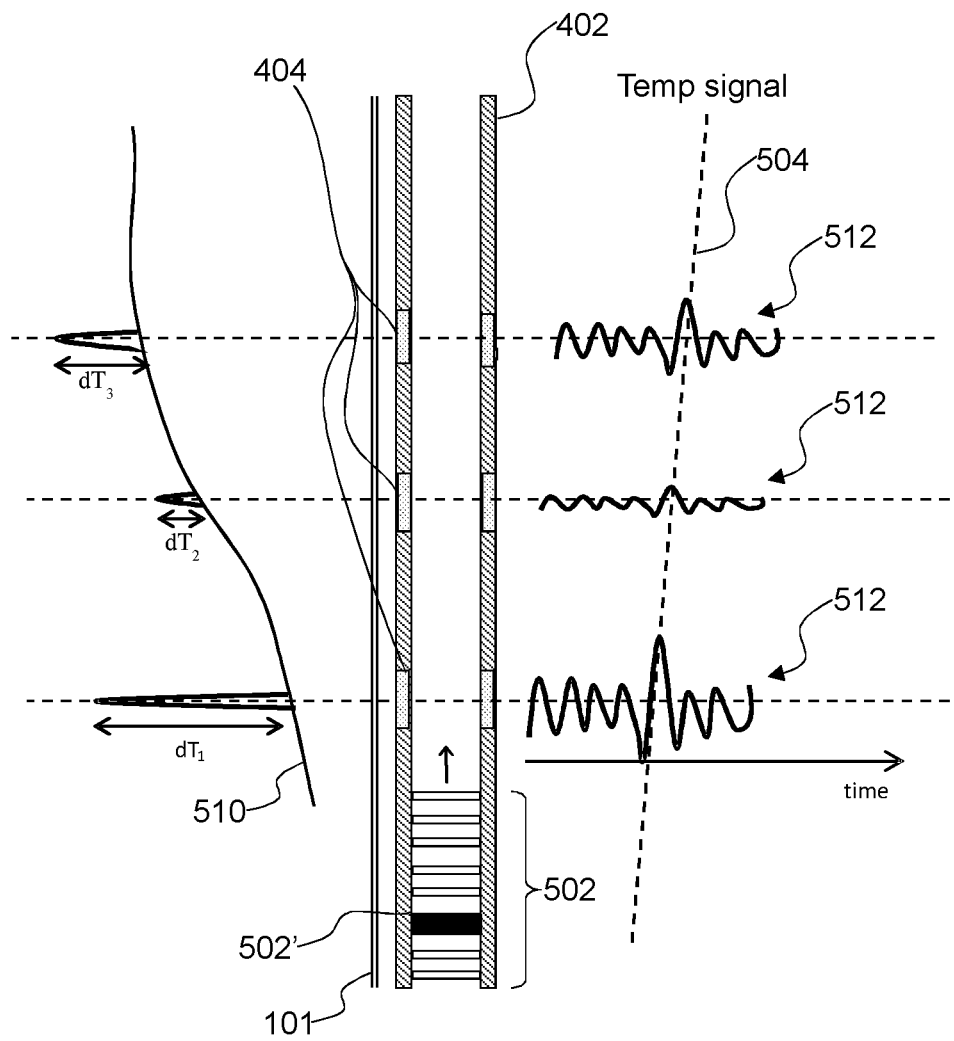
FIGS. 5-8 shows signals associated with locations in a well.

By consideration of these factors, the present inventors have developed a model of a gas well, as is shown in FIG. 5, in which a group of slugs 502 progress up a well shaft. As a slug 502 passes a perforation 404, there is a temperature change, which is detected by the interrogator unit 100. In general, the temperature at the fibre 101 portion adjacent to the perforation will usually increase then decrease as the slug travels to and past the perforation region. The sequence of slugs 502 create oscillatory temperature changes 512. As shown in FIG. 5, the path of a given slug (which for the purpose of example is a large slug 502') can be tracked past each perforation 404, in this case (as it is relatively large) as a larger temperature change. The time offset between detections (i.e. the gradient of 504) is an indication of the speed of the slug. It has been observed that, at least for localised sections of a well bore, the slug speed remains approximately constant (and indeed this gradient may be used to determine velocity, and to indicate whether it is indeed approximately constant). However, when looking at the whole well variations in the slug velocity can often be seen. Therefore, while in some embodiments, the speed of the slug may be treated as a constant, in other models, the velocity of the slugs may be considered to be variable.

FIG. 5 shows a thermal gradient 510 of the well 400 (which may have been determined for other purposes). At each perforation 404, the Joule Thompson cooling causes the local temperature to dip below that of the background thermal gradient.

The amplitude of each temperature dip, as shown relative to the thermal gradient 510 as $dT_{1-3}$, is related to amount of gas inflow at each perforation 404, with higher inflow generally resulting in a larger temperature dip. As the skilled person will appreciate, the temperature gradient 510 and the dips $dT_{1-3}$ are not to scale and amplitude of the dips has been exaggerated on this figure for clarity. In some cases, especially for perforations with low inflow, they may be difficult to distinguish from other localised variations in the thermal gradient 510.

For the purpose of discussion, while it might therefore be considered that the middle perforation 404 (which is associated with a relatively small dip $dT_2$) is producing less gas than the lowest perforation 404 (which is associated with a relatively large dip $dT_1$), in practice, care should be taken when making such assumptions: the skilled person will be aware that there are other processes which could affect the temperature change, and that the Joule Thompson effect is dependent on, amongst other factors, pressure, which varies with well depth. However such factors may be taken into account for a given well.

Although in this example, DAS (i.e. Rayleigh backscattering based) sensing principles are used (and are sensitive enough to detect these temperature changes), alternative temperature sensing techniques could be used.

While for the purpose of illustration, the slugs 502 are shown as regular formations, each spanning the whole cross section of the well, the skilled person will be aware that this may not be the case. Slugs may occupy only part of the cross section, in some examples having an annular form (which may or may not be a complete annulus) in contact with the walls of the well 400.

The thermal gradient 510 provides an 'equilibrium' temperature for each point in the well, i.e. the temperature that the well would have absent of any fluid flow. As will be appreciated by the skilled person, the thermal gradient is used for many purposes in relation to a well, including as a baseline for temperature excursions, but also for geological surveys, determining the conductivity of substances such as brine at a given depth, etc. The thermal gradient may be measured (for example during production of the well, during shut-in periods, or through repeated logging runs) or may be estimated based on, for example, the known thermal gradient in the region, the composition of the ground surrounding the well, or the like.

The signal magnitude corresponds to the temperature change caused by the passing slugs 502 which in turn is related to the heat transfer and is due to a combination of factors. These factors include the cooling effect of gas inflow and therefore the volume of gas entering the well at a given perforation 404, as a larger cooling will result in a greater difference between the temperature of the slug and the perforation. It will also depend on the heat transfer capabilities of the slug which will be related to the amount of liquid in it. Thus signals at the lowest perforation 404 in the figure which has a larger degree of cooling (i.e. is associated with a relatively large dip $dT_1$) will be greater than those in the middle perforation 404 where the cooling is less (i.e. it is associated with a relatively small dip $dT_2$).

Figure 6:
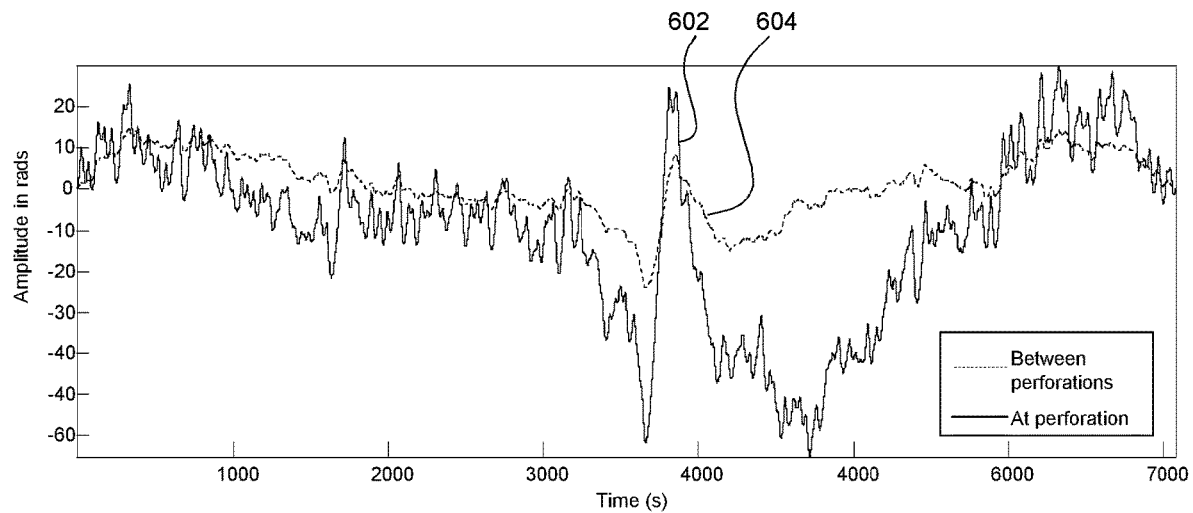

FIG. 6 shows the signals due to temperature changes gathered at a single perforation over time (solid line 602) along with the temperature signals gathered at a location which is between perforations (dotted line 604). It can be seen that the signal between perforations is less variable than the signal at the perforation.

Although the signal between the perforations is smaller, there is nevertheless an appreciable signal. This is due to the temperature difference between the well and the passing slugs 502. A slug 502 having moved up from further down the well will generally be warmer than the background thermal gradient 510 of the well. At a perforation 404 the temperature will generally be less than this background gradient 510 due to the effect of gas inflow so the temperature difference between the slug 502 and the well 400 will be greater than at locations between perforations 404 where the well temperature will be closer, or at the temperature associated with the background thermal gradient. Thus the signals from between perforations 404 will tend to be smaller than those obtained at perforations 404.

Over time (perhaps minutes or hours, which allows a reasonable picture to be obtained whilst still being able to assume that the well 400 will have maintained a roughly steady state, and ensuring that enough slugs 502 have passed to ensure both that a representative sample will have been obtained from each perforation, and that any variation in measurement due to noise, etc. will be smoothed) the temperature fluctuations can be used to give a measure of signal size (e.g. an indication of the sum of the temperature excursions) at various points over a well.

Figure 7:
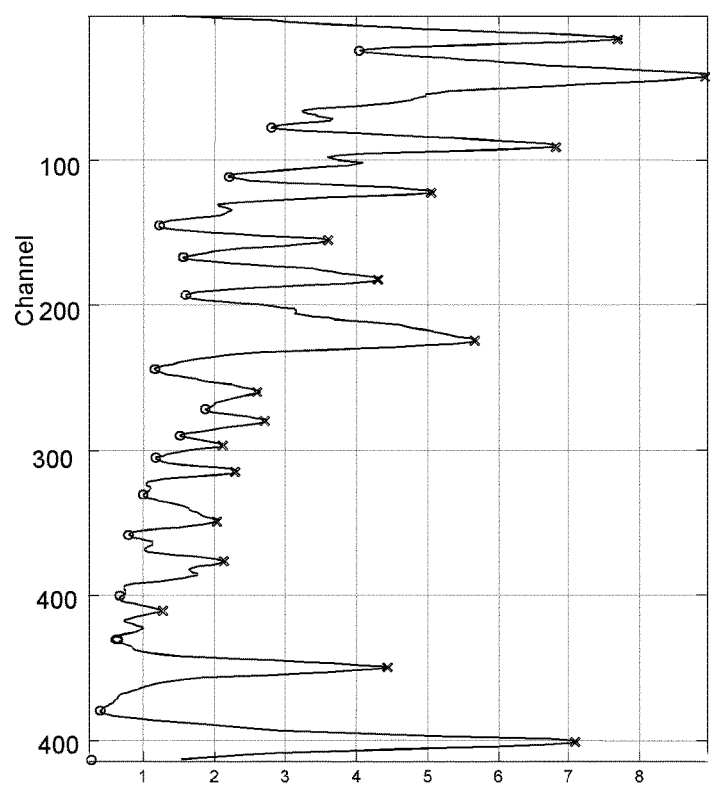
Figure 7:
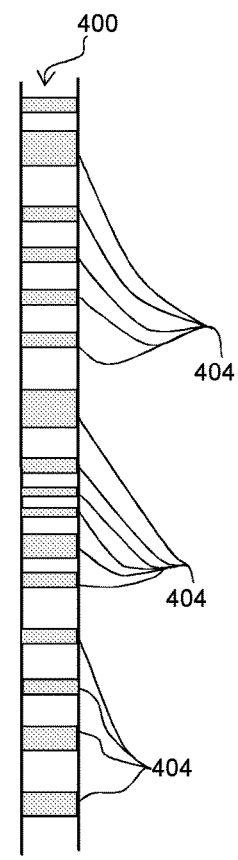

Example data is shown in FIG. 7, in which signals at perforations marked with an X can be compared the signal levels between perforations marked with a O. This gives rise to set of signals (the signals at each perf, $S_{perf\ n}$, and the signals between the perforations, $S_{null\ n}$). The peaks and troughs providing these signals can be identified at least in part from the known location of the perforations 404, or could be identified from analysis of the signals to identify the peaks or a combination of these techniques (and/or other techniques) could be used. Knowledge of other factors which may contribute to the signal allows them to be filtered out or ignored if possible.

The data shown in FIG. 7 is produced by integrating the signal energy in a frequency band that captures the temperature oscillations associated with the slug flow passage. This could be achieved by summing a Fast Fourier Transform FFT in the frequency range or obtaining the RMS of the data after filtering to the desired frequency range. In this example, the signal level data was calculated by taking a RMS power level after high pass filtering at 0.003 Hz to remove any slow drifts in the DC level of the data (for example, the well may be gradually cooling or warming). Although in this example, the threshold was set to 0.003 Hz, the frequency threshold may be determined on the basis of an individual well in a given state by examining the data and estimating the frequency of the temperature oscillation caused by the slugs, which is related to slug velocity, and ensuring this information is maintained. Although the actual temperature signal may be seen at lower frequencies, there will be a significant signal at this frequency range, and it has been noted that this signal will also be amplified at the perforations. As noted above, although low pass filtering may be desirable in some embodiments to remove acoustic signals for example, this may not always be necessary.

The cause of these signals is the interaction of the slugs with the surroundings. The magnitude of temperature change will be related both to the temperature difference between the slugs and the surroundings at the point in the well and to the volume of water. Further, while more water may be added at each perforation 404, under normal conditions, little or no water will be lost. Therefore, the signal $S_{perf\ n}$ at a perforation n may have the terms:

$$S_{perf\ n}=k([dT_{perf\ n}+dT_{slug}]\times\Sigma_1^n W_{perf\ n}) \quad \text{(eqn. 1)}$$

where $dT_{perf\ n}$ is the departure from the temperature that might be expected in a steady state condition given the well's thermal gradient (which, as noted above, is related to the volume of gas introduced into the well at that perforation), $dT_{slug}$ is the difference between the temperature of the slug and the steady state well temperature and $W_{perf\ n}$ is the water from a given perforation (summed to give the total amount of water available for thermal conduction), and k is a constant.

As noted above, the signal is also dependent on the velocity of the slug, but this is assumed to be constant in this model. If in fact the velocity is found not to be constant over the whole well, it may be preferred to consider the well in sections, the length of each of those sections being limited to that over which the velocity can, to a good approximation, be considered as constant. Otherwise, the velocity could be included in the model.

Therefore, it can be appreciated that the term $[dT_{perf\ n}]$ is the 'change relative to background' shown in FIG. 5 as peaks $dT_{1-3}$.

This equation has several terms of interest: if the $dT_{perf\ n}$ term could be found, this could be used to give a measure of production of gas at perforation n, which would be of use to a well operator. Second, if the $W_{perf\ n}$ terms could be found, this might identify the perforations which are introducing excessive amounts of water into the well 400.

Nevertheless, this equation cannot be solved analytically, as it contains too many unknown variables. In particular, it will be appreciated that it is difficult to measure $dT_{slug}$ absolutely, as it is unlikely that the fibre 101 will come into thermal equilibrium with a slug 502 due to the its finite transit time. However, the inventors of the current application have realised that considering the signal between the perforation provides additional information.

Specifically, the signal between the perforations (which is proportional to the temperature excursion) can be modelled as follows (where the terms are as defined above):

$$S_{null\ n}=k(dT_{slug}\times\Sigma_1^n W_{perf\ n}) \quad \text{(eqn. 2)}$$

This equation is also underdetermined, as k and $dT_{slug}$ are unknown. However, when coupled with equation 1 and with a sufficiently large number of perforations, the number of unknowns is only slighter more than the number of equations (when expanded), which allows a best fit numerical solution to be found, for example using a least squares algorithm. As n increases, and as long as the slug velocity is at least approximately constant, the reliability of the best fit solution will increase.

It is also noted that, typically, the thermal gradient in a well means that a slug travels from a hotter region to a cooler region, and in doing so deposits heat. Therefore, it could also be considered that the term $kdT_{slug}$ will be related to the thermal gradient. Indeed, it may be, to a reasonable approximation, proportional to the thermal gradient. Whilst this is not essential, in some examples the thermal gradient will be known (or can be readily determined by the skilled person using known techniques). This could be carried out at just some of the nulls, and could be used to inform the best-fit process. Indeed, it may be possible to solve this for all nulls, which could allow an absolute solution (i.e. analytical rather than numerical) to the inflow.

The best fit solution could be constrained according to other known (or estimated) features of the gas well. In particular, it could be assumed that none of the water or gas terms will be negative, as in practice little to no water or gas should escape the well bore, so one constraint might be that no such terms are negative. In addition, it may be possible to obtain some absolute temperature information. As, while noted above, it may be difficult to measure the absolute temperature difference $dT_{slug}$ due to the finite transit time, it may be possible to obtain measurements of some of other temperatures or temperature changes, for example using techniques such as Distributed Temperature Sensing (DTS)

or providing other temperature sensors in the well. It may be that, in practical terms, such sensors could be used to determine or estimate some of the larger temperature changes or it may be able to give an indication of $dT_{perf}$ in some locations.

As the skilled person will be aware, there can be significant water at the bottom of a well, indeed there may be a portion of standing water. Therefore, the method is preferably employed over a section of the well which is sufficiently far from the bottom of the well to avoid risk that the data could be influenced by standing water.

The best fit solution is sensitive to the initial amount of water. In particular, if the lowermost perforation injects a large amount of water, it may be that subsequent water terms may not be readily distinguishable. Therefore, a supplementary technique, such as a known flow monitoring technique could be used in particular to inform the model at the base of the well (although they could also be used throughout the well).

Alternatively or additionally, it may be preferred to start the method as far down the well as possible, before significant water inflow. More generally, the amount of water at the base of the well may be considered when assessing the confidence in the model. For example, a well which appears to be producing more water from higher than from lower perforations may be considered with a higher degree of confidence as to its accuracy than if the reverse is true.

Looking again at FIG. 7, the generally increasing nature of signal at the nulls is due to water inflow. The peak height above this trend is related to a temperature change due to gas inflow, but scaled by the water terms.

Figure 8:
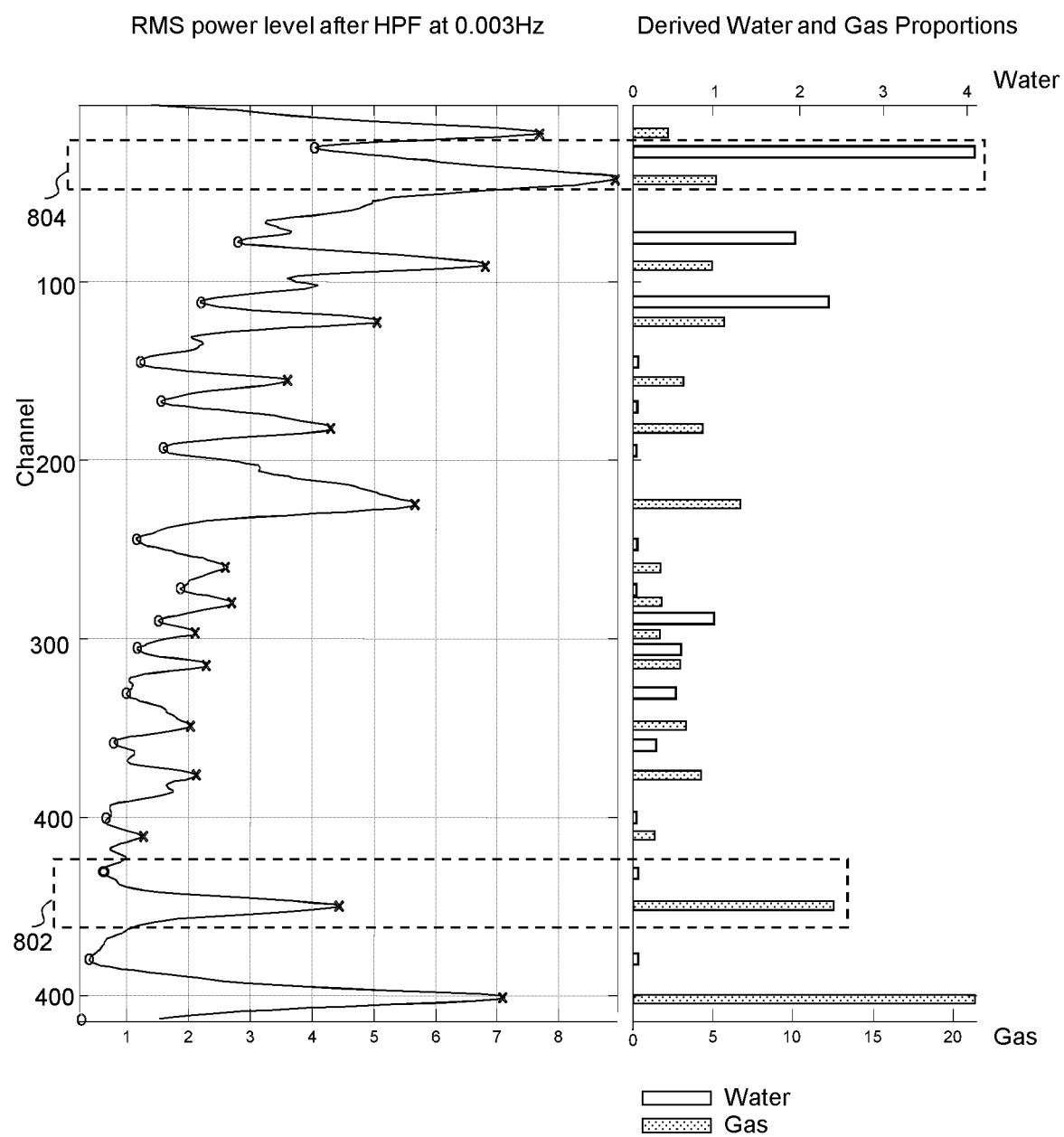

FIG. 8 shows how the proportions of gas and liquid introduced at particular perforations for a given well, using the data first presented in FIG. 7. The peaks and troughs identified and indicative of the gas and water contributions at each perforation can be determined, as shown on the bar chart to the right of FIG. 8. It should be noted that these are not absolute measurements, but are instead proportional contributions (and the gas and water bars are not on the same scale). The absolute values could be obtained by considering actual totals of gas and water production, as will generally be measured at the point of extraction.

For the purpose of discussion, data associated with two perforations is indicated on FIG. 8 as 802 and 804 respectively. The feature at 802 shows a strong gas inflow signature at the perforation (i.e. a long bar compared to the other gas bars) and the water added by the perforation is fairly minimal when considering the height of the other water bars. In other words, this perforation is currently producing a useful output. Considering the second perforation, indicated at 804, the gas production here is relatively low, slightly more than a third of the gas produced at 802, but overall, the perforation is producing more gas than a large proportion of the perforations. However, the proportion of water contributed by this perforation is high-higher than any other perforation.

Therefore, the well operator can critically review the economics of keeping this perforation open. This will include the costs associated with the treatment of the water produced (which could vary considerably depending on whether the water needs to be removed over land or can be pumped back in to the well, etc.), the increased cost associated with separating the gas from the water, as well as the value of the gas produced. This could be done in conjunction with other calculations relating to the well's efficiency, using known techniques. Therefore, the water and gas inflow information calculated as described herein could form part of a well management system, which may consider other factors or measurements.

Variations to the above described embodiments will occur to the skilled person and are within the scope of the invention. For example, while 'DAS' style temperature sensing (i.e. temperature sensing based on Rayleigh backscattering in an unmodified optical fibre) has been described above, any temperature sensing technique which is sufficiently sensitive and reactive to detect small and brief temperature changes due to slug passage could be used. It will be appreciated that, in the present invention, changes of temperature rather than the absolute temperature are of interest. As the 'DAS' techniques described above produce a linear signal indicative of temperature change, it is particularly convenient. However, for example, DTS sensing, in which higher power optical radiation is used to interrogate a fibre to produce Raman and Brillouin backscattering could be used, which are indicative of an actual temperature value. Alternatively, thermometers may be positioned within the well, either in place of or to supplement the 'DAS' temperature techniques described herein.

The invention claimed is:

1. A method of obtaining an indication of fluid inflow in a section of a gas well having multiple perforations through which fluids comprising gas and/or liquid enter the well, the method comprising the steps of:
   (i) monitoring a temperature at a plurality of locations within the section of the gas well, the locations comprising (a) a first set of locations, at or near a perforation; and (b) a second set of locations at which the temperature is substantially independent of the effects of inflow of gas at a perforation;
   (ii) determining an indication of temperature excursions at the locations;
   (iii) obtaining the indication of the inflow of fluids to the well by relating the indications of temperature excursions from the second set of locations to liquid inflow and relating the indications of temperature excursions from the first set of locations to liquid and gas inflow wherein the liquid inflow is estimated by considering the indication of temperature excursions at each of the second set of locations as being proportional to:
   $dT_{slug} \times \Sigma_1^n W_{perf\ n}$, where $dT_{slug}$ is the temperature difference between liquid rising in the well at that location and the equilibrium temperature at that point, n is the nth perforation in the section of the well, and $\Sigma_1^n W_{perf\ n}$ is a total amount of liquid in the well passing that location.

2. A method according to claim 1 in which the second set of locations comprise locations between the perforations.

3. A method according to claim 1, wherein the method comprises determining an indication of inflow of water from at least one perforation.

4. A method according to claim 1, wherein the method comprises determining an indication of inflow of gas from at least one perforation.

5. A method according to claim 1, in which the temperature excursions are monitored over a period of time, and the step of determining an indication of temperature excursions comprise one or more of: summing temperature fluctuations, averaging temperature fluctuations, integrating signal energy arising from temperature fluctuations detected over said period.

6. A method according to claim 1 in which at least one of the second set of locations is above all well perforations to provide an estimate of the temperature excursion due to a total volume of water produced by the well.

7. A method according to claim 1 which further comprises obtaining a measurement of the total volume of gas produced by the well section, and further estimating a volume of gas inflow at each perforation by reference to the total volume of gas and the relative indications of the inflow of gas.

8. A method according to claim 1, in which the first set of locations comprises locations at each perforation of the well section.

9. A method according to claim 1 which comprises determining the well section in which to apply the method, the section comprising a section in which the speed with which fluid rises through the well is substantially constant.

10. A method according to claim 1 which comprises determining the well section in which to apply the method, the section comprising a section which is free of standing liquid.

11. A method according to claim 1 in which the step of monitoring is carried out by monitoring backscatter in an optical fibre suitable for use in a Distributed Acoustic Sensing apparatus.

12. A method according to claim 1 in which the temperature is determined at least one location.

13. A method of obtaining an indication of fluid inflow in a section of a gas well having multiple perforations through which fluids comprising gas and/or liquid enter the well, the method comprising the steps of:
   monitoring the temperature at a plurality of locations within the section of the gas well, the locations comprising (a) a first set of locations, at or near a perforation; and (b) a second set of locations at which the temperature is substantially independent of the effects of inflow of gas at a perforation;
   (ii) determining an indication of temperature excursions at the locations;
   (iii) obtaining the indication of the inflow of fluids to the well by relating the indications of temperature excursions from the second set of locations to liquid inflow and relating the indications of temperature excursions from the first set of locations to liquid and gas inflow wherein the inflow of liquid and gas are estimated by considering the indication of temperature excursions at each of the first set of locations as being proportional to:

$$[dT_{perf\,n} + dT_{slug}] \times \Sigma_1^n W_{perf\,n},$$

where n is the nth perforation in the section of the well, $dT_{perf\,n}$ is the temperature difference from an equilibrium temperature due to the inflow of gas perforation n, $dT_{slug}$ is the temperature difference between liquid rising in the well at that point and the equilibrium temperature at that location, and $\Sigma_1^n W_{perf\,n}$ is a total amount of liquid in the well passing that location.

14. Apparatus for obtaining an indication of fluid inflow in a section of a gas well having multiple perforations through which fluids comprising gas and/or liquid enter the well, comprising:
   (i) an optical fibre, arranged along the length of the well section;
   (ii) an interrogator unit arranged to interrogate the optical fibre with optical radiation and to detect any radiation backscattered within the optical fibre;
   (iii) processing circuitry arranged to process the detected signals to determine an indication of temperature excursions at (a) a first set of locations, at or near a perforation and (b) a second set of locations at which the temperature is substantially independent of the effect of inflow of gas at the perforation;
   (iv) wherein the processing circuitry is further arranged to determine the indication of the inflow of fluids to the well by relating the indications of temperature excursions from the second set of locations to liquid inflow and relating the indications of temperature excursions from the first set of locations to liquid and gas inflow and wherein the inflow of liquid is estimated by considering the indication of temperature excursions at each of the second set of locations as being proportional to:

$$dT_{slug} \times \Sigma_1^n W_{perf\,n},$$

where $dT_{slug}$ is the temperature difference between liquid rising in the well at that location and the equilibrium temperature at that point, n is the nth perforation in the section of the well, and $\Sigma_1^n W_{perf\,n}$ is a total amount of liquid in the well passing that location.

15. Apparatus according to claim 14 in which the interrogator unit comprises
   (i) an optical source configured to, in use, launch a series of interrogations, each interrogation comprising a pulse pair, into an optical fibre, wherein the pulses of the pulse pair are introduced to the optical fibre with a time interval there between;
   (ii) a sampling detector configured to, in use, sample radiation which is Rayleigh backscattered from within said optical fibre from the interrogations; and
   the processing circuitry is configured to determine any phase modulation in the samples.

16. Apparatus according to claim 15 in which the processing circuitry comprises at least one low pass filter arranged to isolate components of the determined phase modulation below a threshold frequency.

17. Apparatus according to claim 15 in which the sampling detector is configured to sample backscatter radiation at substantially the same time after launch of each pulse pair, and the processing circuitry is arranged to form at least one channel signal comprising samples of the backscatter radiation acquired at substantially the same time after launch of each pulse pair; and said channel signal is demodulated to determine the phase modulation for the channel signal.

18. Apparatus according to claim 17 in which the channel signal is a phase modulated carrier signal produced from interference between radiation backscattered from each pulse pair of the series of pulse pairs.

19. Apparatus according to claim 18 in which the processing circuitry is arranged to demodulate the channel signal to derive In-Phase and Quadrature terms therefrom.

20. Apparatus according to claim 19 in which the at least one low pass filter is arranged to filter the In-Phase and Quadrature terms.

21. Apparatus according to claim 15 in which the optical source comprises a laser and the processing circuitry is arranged to estimate laser phase noise.

* * * * *